Nov. 8, 1960   R. E. MORRAH   2,959,776
AIRCRAFT DISTRESS UNIT
Filed April 28, 1958   4 Sheets-Sheet 1
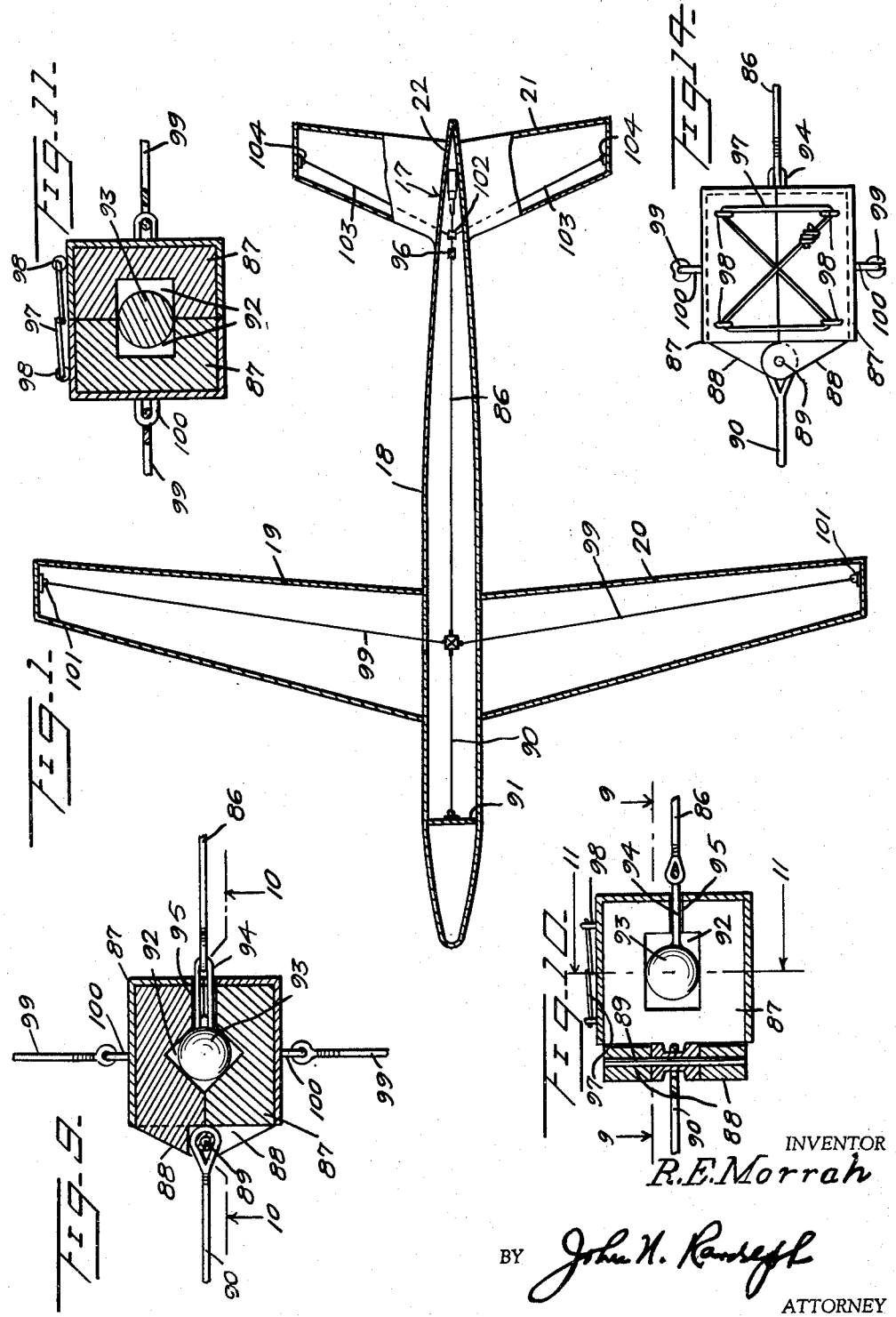
INVENTOR
R.E.Morrah
BY John H. Randolph
ATTORNEY

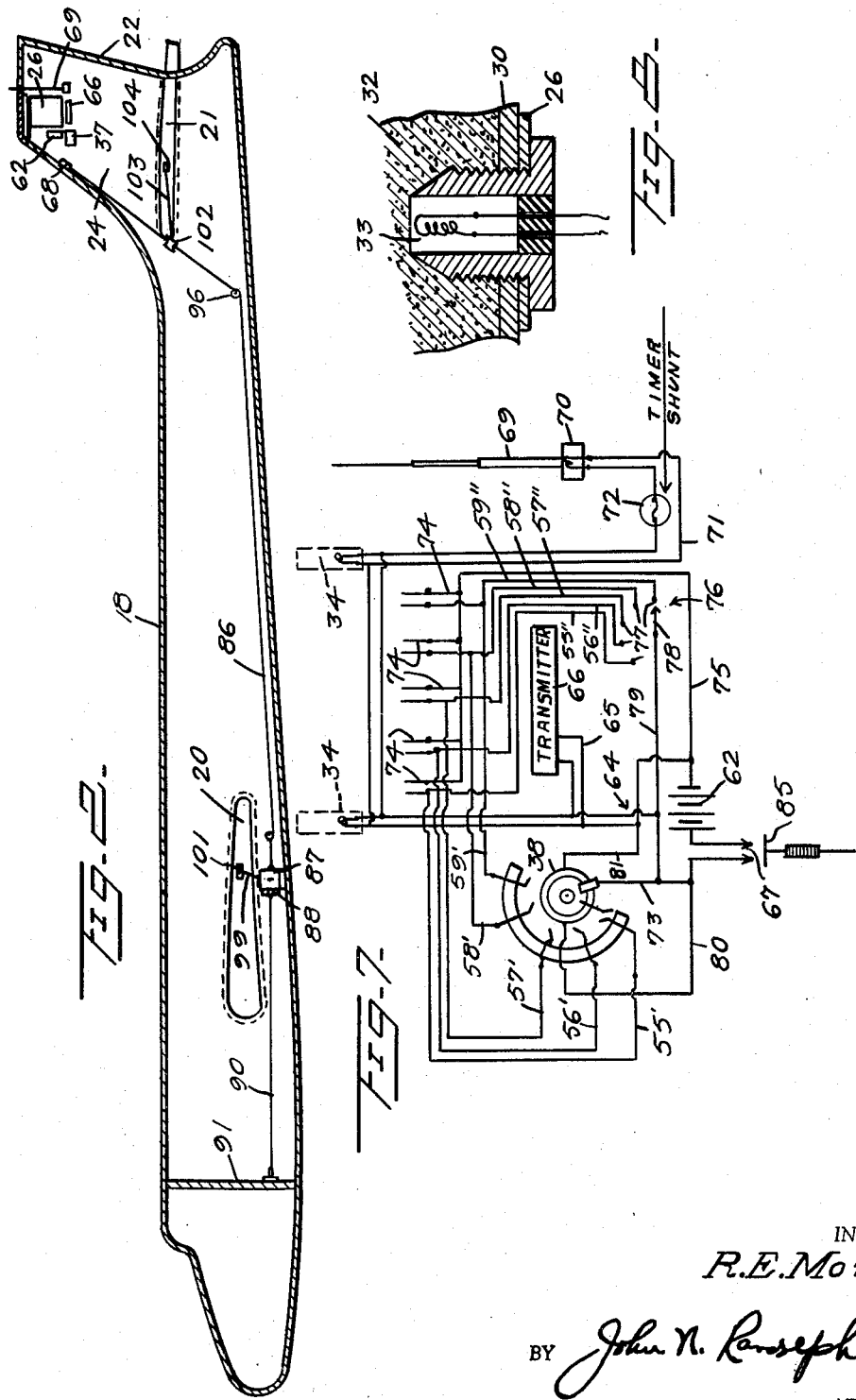

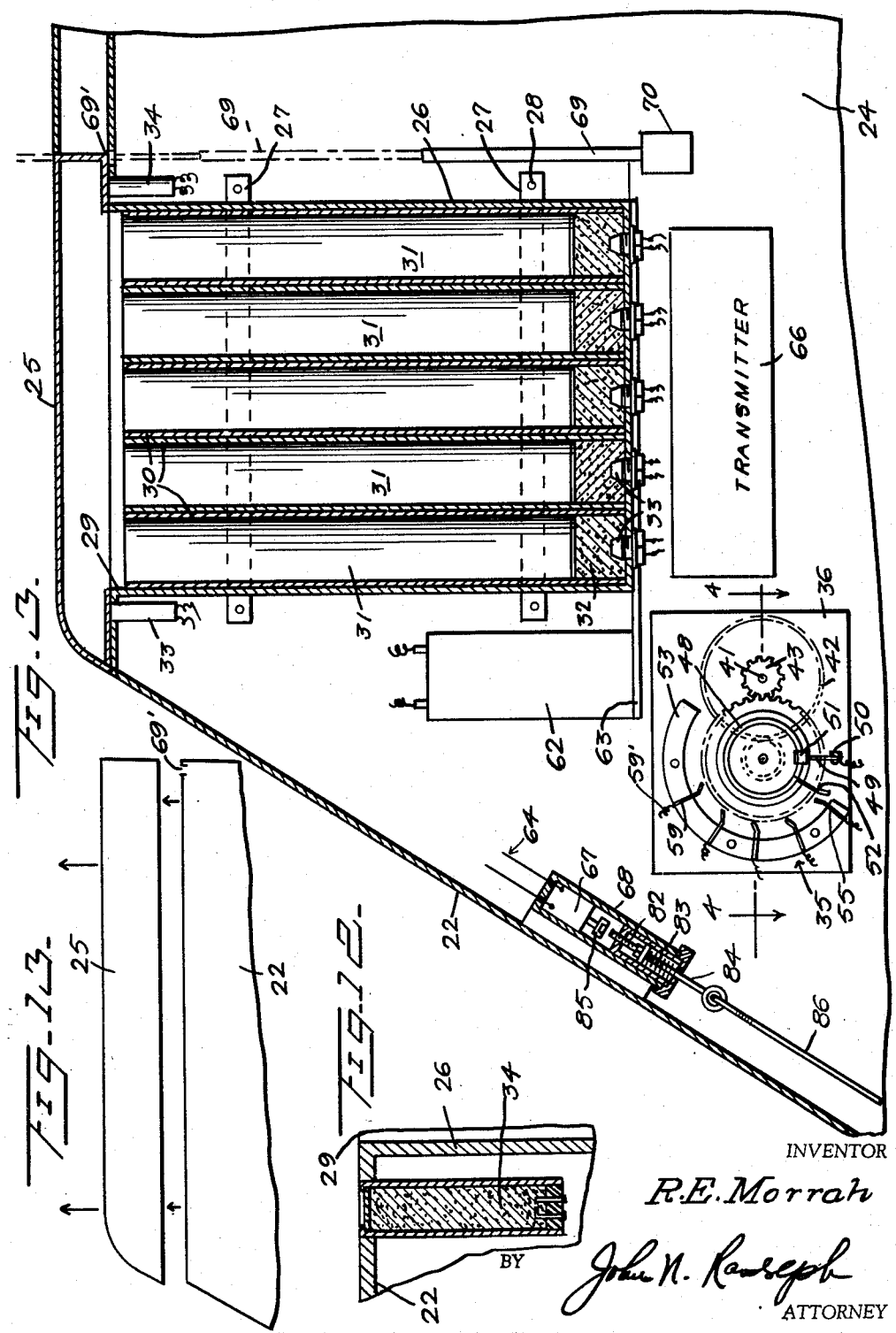

Nov. 8, 1960   R. E. MORRAH   2,959,776
AIRCRAFT DISTRESS UNIT
Filed April 28, 1958   4 Sheets-Sheet 4
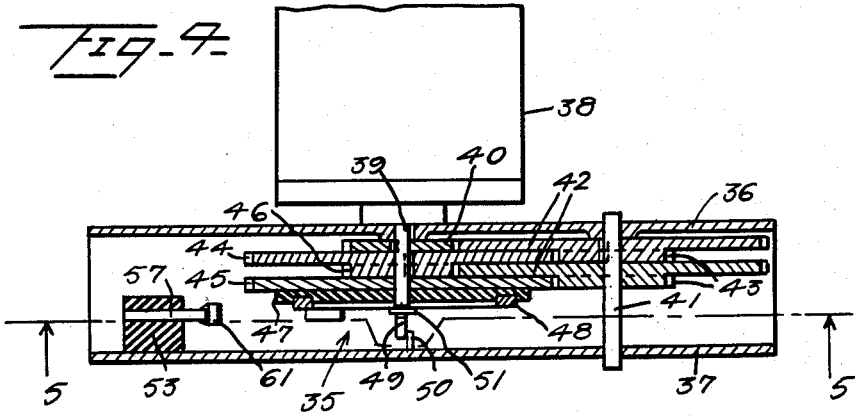
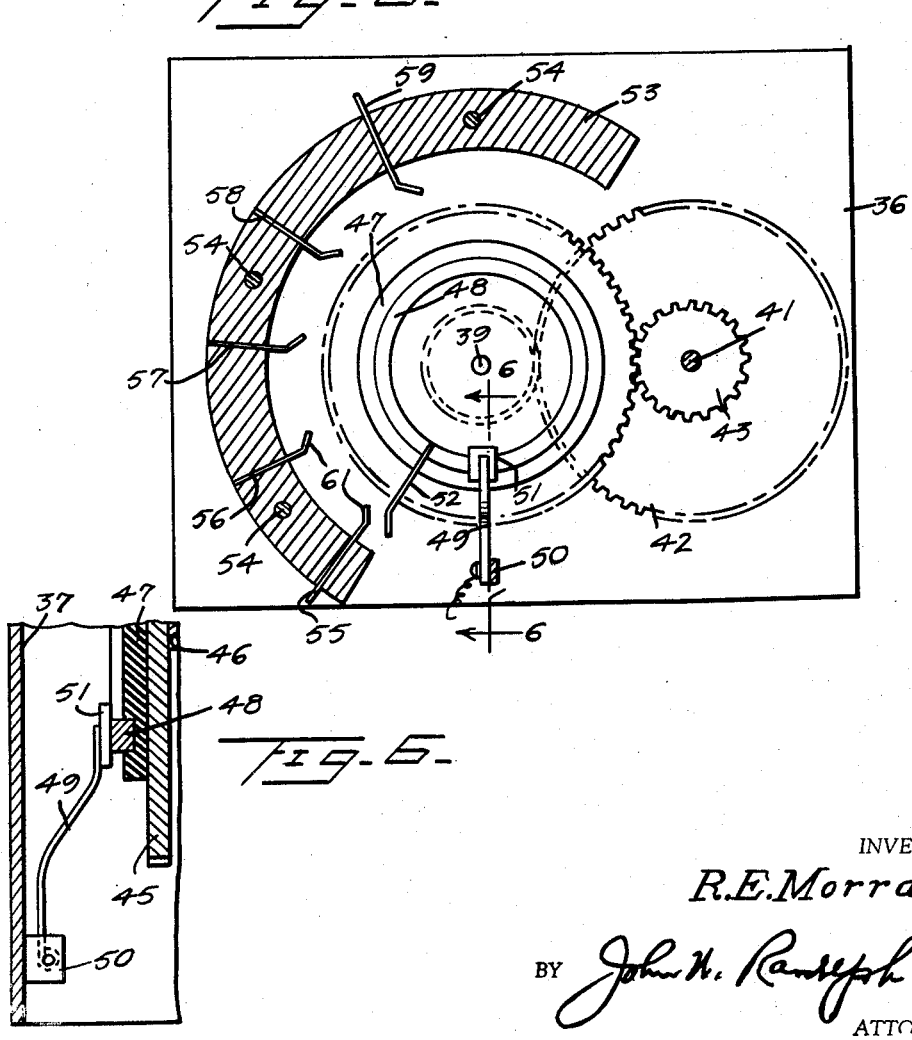
INVENTOR.
R.E.Morrah
BY John H. Randolph
ATTORNEY United States Patent Office 2,959,776
Patented Nov. 8, 1960

2,959,776

AIRCRAFT DISTRESS UNIT

Ronald E. Morrah, 99 St. Marks Place, New York, N.Y.

Filed Apr. 28, 1958, Ser. No. 731,347

5 Claims. (Cl. 340—366)

This invention relates to a novel electro-mechanical device adapted for installation in aircraft, especially large airplanes, and has for its primary object to provide an apparatus which will be automatically rendered operative by a crash landing of the airplane to commence signaling the location of the crashed plane by means of both audible and visual signals.

More particularly, it is a primary object of the present invention to provide a distress unit which will immediately commence giving audible and visual signals after a crash landing of the aircraft for guiding rescue planes and rescue parties to the location of the airplane, to thus avoid delays which are now inherent in such rescue work and which will save many lives of injured passengers and crew of airplanes and who now die before a rescue party can reach the crash scene.

Still a further object of the invention is to provide a distress unit the signals of which will guide rescue facilities to the crashed plane at nighttime as well as during daylight hours.

Still a further object of the invention is to provide a distress unit a portion of which is mounted in a part of the plane seldom damaged by crash landings and from which the audible and visual signals of the unit are transmitted.

Still another object of the invention is to provide a distress unit having novel means for activating audible and visual signals through damage to other portions of the aircraft which are most susceptible to damage in a crash landing.

Various other objects and advantages of the invention will hereinafter become more fully apparent from the following description of the drawings, illustrating a presently preferred embodiment thereof, and wherein:

Figure 1 is a horizontal sectional view of the fuselage, wings and tail of an airplane and illustrating portions of the distress unit located therein;

Figure 2 is a side elevational view, on an enlarged scale, partly in section, of the airplane and illustrating additional parts of the distress unit;

Figure 3 is an enlarged fragmentary vertical sectional view, partly in elevation, showing a part of the distress unit mounted in the vertical stabilizer of the airplane;

Figure 4 is an enlarged horizontal sectional view, partly broken away, taken substantially along a plane as indicated by the line 4—4 of Figure 3;

Figure 5 is a vertical sectional view, taken substantially along a plane as indicated by the line 5—5 of Figure 4;

Figure 6 is an enlarged fragmentary vertical sectional view, taken substantially along a plane as indicated by the line 6—6 of Figure 5;

Figure 7 is a diagrammatic view of the electric circuits of the signaling apparatus;

Figure 8 is an enlarged fragmentary vertical sectional view of one of the ignitors shown in Figure 3;

Figure 9 is an enlarged horizontal sectional view of the release device shown in Figure 1 and taken substantially along a plane as indicated by the line 9—9 of Figure 10;

Figure 10 is a vertical sectional view of the release device, taken substantially along a plane as indicated by the line 10—10 of Figure 9;

Figure 11 is a cross sectional view of said release device, taken substantially along a plane as indicated by the line 11—11 of Figure 10;

Figure 12 is a fragmentary vertical sectional view, on an enlarged scale, of one of the cover ejecting squibs;

Figure 13 is a fragmentary side elevational view of the upper portion of the vertical stabilizer showing the removable cover slightly separated, and Figure 14 is a fragmentary top plan view of the release unit of Figures 9, 10 and 11.

Referring more specifically to the drawings, for the purpose of illustrating a preferred application and use of the automatic distress unit, designated generally 17 and comprising the invention, a fuselage 18, wings 19 and 20, tail structure 21 and vertical stabilizer 22 of a large airplane have been illustrated in Figures 1 and 2 of the drawings.

The vertical stabilizer 22 defines a cavity 24 of sufficient size to accommodate a substantial part of the distress unit. Said distress unit includes a removable cover 25 forming a top or ridge portion of the vertical stabilizer 22. A casing 26 is embraced by straps 27 which are secured by fastenings 28 to portions of the vertical stabilizer 22 for mounting the casing 26 within the upper part of the vertical stabilizer 22 and so that the open top 29 of said casing will be closed only by the cover 25. The casing 26 contains a plurality of rocket flare tubes 30 which are mounted in upright positions therein and which have open upper ends located adjacent the open top 29 of the casing 26. Each tube 30 contains a rocket flare 31. Each tube 30 also contains a propellent charge 32 disposed below the rocket flare thereof. An electrical ignitor 33 is mounted in and extends through the bottom of each tube 30 and into the propellent charge 32 of said tube, said ignitors 33 having base portions projecting from the bottom of the casing 26.

Ejector squibs 34 are mounted in the upper portion of the vertical stabilizer 22 beyond front and back edges of the casing 26 and beneath the ends of the cover 25.

As best seen in Figures 4 to 6, a multiple type electric switch, designated generally 35, is mounted between two plates 36 and 37 which are secured within the vertical stabilizer 22 in any suitable manner and which are disposed in spaced apart relation to one another. An electric motor 38 is mounted on the outer side of the plate 36 and has an armature shaft 39 extending through and rotatably mounted in the plate 36 and to which is secured a pinion 40. A shaft 41 extends through and is mounted in the plates 36 and 37 and has a plurality of gears 42 and pinions 43 journaled thereon. The armature shaft 39 is provided with two additional gears 44 and 45 and a pinion 46 which are journaled thereon. The drive pinion 40 drives a gear 42 which is disposed coplanar therewith and a gear 43 which is fixed to said gear 42 and which meshes with and drives the gear 44. The pinion 46 which rotates with the gear 44 meshes with and drives the other gear 42 and the other pinion 43 which is secured thereto and which in turn meshes with and drives the gear 45. Thus, the gears and pinions 42—46 form a reduction drive whereby the gear 45 is driven at a greatly reduced speed relative to the drive pinion 40.

A ring or disc 47 of electrical insulating material is fixed to the outer side of the gear 45 and has a ring 48 of brass or other electrical conducting material partially embedded therein and secured thereto. A spring arm 49 of electrical conducting material is supported by a bracket 50 which is secured to the plate 37, as best seen in Figure 6. A plate 51 of electrical conducting material such as brass is supported by the free end of the spring arm 49 in wiping contact with the ring 48. A resilient contact arm 52, as seen in Figure 5, is secured to and projects radially from a portion of the periphery of the ring 48 and has its inner end embedded in the ring 48 below the outer face thereof so that the contact 52 will not be physically contacted by the plate or brush 51. An arcuate strip of electrical insulating material 53 is secured by fastenings 54 to the plate 37 and is supported thereby concentrically around a portion of the conductor ring 48. A plurality of spring contacts 55—59 are mounted in the strip 53 in electrically insulated relation to one another. Said contacts 55—59 have inner free ends 61 which are yieldably disposed relative to the mounting strip 53 and in the path of travel of the outer end of the contact arm 52, so that when the arm 52 travels in a circular path with the ring 48 and gear 45, said outer end of the arm 52 will successively engage the inner ends 61 of the contact strips 55—59 and at spaced time intervals, as will hereinafter be more fully described.

A self-contained current source 62, such as a six volt battery, is mounted within the vertical stabilizer 22 on a bracket 63 and is connected by wiring forming an electric circuit 64 to the two ejector squibs 34. A branch 65 of the electric circuit 64 is connected to a conventional radio transmitter 66 which is also suitably supported in the vertical stabilizer 22 and which is pre-tuned to operate automatically on international "mayday" frequency when energized. A normally open electric switch 67 is interposed in the electric circuit 64 to normally maintain the electric circuits 64 and 65 de-energized. The switch 67 is mounted in one end of a tubular casing 68 which is supported immovably in a part of the vertical stabilizer 22, as best illustrated in Figure 3.

An extensible antenna 69 for the transmitter 66 is suitably mounted in the vertical stabilizer 22 behind the casing 26 and with its extensible upper portion in alignment with an opening 69' of the top portion of the stabilizer 22 which is normally closed by the rear end of the cover 25. A squib 70, similar to the squibs 34, is connected to the lower end of the extensible antenna 69 for extending said antenna when the squib 70 is ignited. The antenna 69 is connected by suitable wiring, not shown, to the transmitter 66 and the squib 70 is connected by a branch circuit 71 to the electric circuit 64, as seen in Figure 7. Said branch circuit 71 includes a timer shunt 72, for a purpose which will hereinafter be described.

A conductor wire 73 leads from one side of the current source 62 to the spring arm 49 for supplying current to the plate 51 and ring 48. The electrical connection between the current source 62 and ring 48 as thus provided is normally broken by the switch 67. The number of contact strips 55—59 corresponds to the number of rocket ignitors 33 and said strips 55—59 have conductor wires 55'—59' leading therefrom to the ignitors 33 so that said ignitors are connected to different ones of the conductor strips 55—59. Branch conductor wires 74 connect with a conductor wire 75 which leads to the other side of the current source 72 and are connected to and lead from the ignitors 33.

A manual switch 76 has five fixed contacts 77 which are connected to the five different conductor wires 55'—59' by conductor wires 55''—59''. A movable contact element 78 of the switch 76 is electrically connected by a wire 79 to the conductor wire 73 and is manually movable selectively into engagement with the different stationary contacts 77, for a purpose which will hereinafter be described.

A conductor wire 80 leads from the conductor wire 73 to one side of the electric motor 38 and a conductor wire 81 is connected to one side of the circuit 64 and leads from the other contact post of the motor 38 and through a part of the circuit 64 to the side of the current source 62 opposite to the side thereof to which the conductor wire 73 is connected.

Referring back to Figure 3, a plunger 82 is slidably mounted in the opposite end of the housing 68 and is urged by a compressed spring 83 toward an actuator 85 of the switch 67 for closing said switch. A rod 84 is connected to the plunger 82 and extends from said last mentioned end of the casing 68 and is connected to an end of a cable 86. The cable 86, which is preferably of about three hundred pound test, is anchored under tension as illustrated in Figures 1 and 9 to 11 to hold the plunger 82 in a retracted position out of engagement with the switch actuator 85 so that the switch 67 is normally maintained in a circuit breaking position.

As best seen in Figures 9 to 11 and 14, a box-like member is formed of two corresponding sections 87 that have ears projecting from forward sides thereof, which ears 88 have overlapping portions engaged by a pivot pin 89 for pivotally connecting the sections 87 together. One end of a cable 90 is secured to the pin 89 between the ears 88 and extends forwardly therefrom and has its forward end anchored to a cross brace 91 in the nose of the fuselage 18. The box sections 87 have mating recesses 92 therein to receive a ball or enlargement 93 formed on one end of a rod 94 which extends through a bore formed by the mating grooves 95 of the sections 87, and which rod 94 projects from the opposite rear side of the connector member, formed by said sections 87, and has its rear end anchored to the opposite forward end of the cable 86, so that the cable is maintained under tension between the box structure 87 and the rod 84. The cable 86 may be trained under a pulley 96 in the fuselage 18, near the base of the stabilizer 22, as seen in Figures 1 and 2. The connector sections 87 are maintained with their recessed faces in abutting engagement, for confining the enlargement 93 therein, by means of a frangible strand 97 which is passed through eyes 98 which project from complementary sides of the two sections 87, and the ends of which strand 97 are secured together. Cables 99 are anchored to and project from eyes 100 which are fixed to and project from remote sides of the connector sections 87. The cables 99 extend away from one another outwardly through the wings 19 and 20 and have their remote ends anchored as seen at 101 to the wing tips, as illustrated in Figure 1.

If desired, a second connector 102, as seen in Figure 1, corresponding to the connector 87, 87 may be interposed in the cable 86 between the pulley 96 and the rod 84 and cables 103, corresponding to the cables 99, may extend from opposite sides of the connector 102 through the tail structure 21 and may be anchored at their remote ends as seen at 104 in the tips of the tail 21. The cables 103 extend rearwardly from the connector 102 so that said cables 103 would not prevent movement of the connector 102 upwardly and rearwardly toward the rod 84.

Assuming that the distress unit 17 is assembled in the aircraft, as illustrated in the drawings and as previously described, and that the aircraft is compelled to make a crash landing, in practically all crash landings the nose portion of the fuselage is caved in or badly damaged and usually one or both of the wings are torn away. Should the nose of the fuselage be caved in or badly damaged the forward end of the cable 90 will be released from its anchor 91 permitting the connector 87, 87 and the cable 86 to move rearwardly, releasing tension from the cable 86 so that the spring 83 can project the plunger 82 against the switch actuator 85 to close the switch 67. If the nose of the airplane is not damaged but either of the wings is torn away, a pull will be exerted on the cable 99 anchored to such damaged wing and which will rupture the frangible strand 97 and permit the connector sections 87 to swing away from one another about their pivot 89, thus releasing the enlargement 93 and tension on the cable 86, so that the plunger 82 can be projected by the spring 83 against the actuator 85 to close the switch 67. Thus damage to the nose or either wing, the parts of an aircraft most susceptible to damage in the event of a crash landing, automatically effects a closing of the switch 67. The vertical stabilizer 22 which houses most of the structure of the distress unit 17 constitutes the part of an aircraft least subject to damage in a crash landing. In some instances the tail structure may be damaged in a crash landing and should either tip portion of the tail 21 suffer such injury the cable 103 connected thereto will exert a pull for releasing the connector 102, in the same manner as previously described in reference to the connector 87, 87, so that the cable portion 86 located between the connector 102 and rod 84 will be released from tension to the spring 83 to project the plunger 82 against the actuator 85 to close the switch 67. Thus, the switch 67 may also be automatically closed if either end of the tail 21 is damaged even though the wings and forward part of the fuselage suffer no damage.

Closing of switch 67, as previously described and as best illustrated in Figure 7, immediately results in current being supplied to ignite the two squibs 34 for ejecting the cover 25 from the ridge of the stabilizer 22 to expose the upper end of the flare case 26 and the opening 69'. The squib 70 is also ignited a few seconds after the squibs 34, due to a delay caused by the timer shunt 72, and provides the force to extend the telescopic antenna 69 almost immediately after the cover 25 has been blown off. At the same time current will be supplied through the branch circuit 65 to energize the transmitter 66 so that an audible distress signal will be transmitted continuously.

Closing of the switch 67 also completes the circuit to the electric motor 38 by means of which the contact ring 48 is rotated clockwise as seen in Figure 5 at a very slow speed, and current is also supplied, by closing of the switch 67, to said conductor ring 48, as heretofore described. Accordingly, as the arm 52 moves with the ring 48 it will initially contact the conductor strip 55 to complete an electric circuit through the wiring 55' and 75 to one of the ignitors 33 for detonating the propellent charge 32 associated therewith to propel the rocket 31, which is disposed above said propellent charge 32, upwardly from the open top 29 of the case 26. The propellent charge 32 is capable of propelling the rocket 31 to an elevation of approximately fifteen hundred feet and the rocket is of a conventional type which releases a parachute at a fifteen hundred foot elevation and which supports a flare which remains illuminated for approximately three minutes. Thus, the firing of each rocket 31 will provide a visual signal either in the daytime or at night to lead rescue parties to the strickened aircraft. The different conductor strips 55—59 are spaced apart distances so that the contact arm 52 will make contact with the successive conductor strips at thirty minute intervals for firing the several rockets 31 at these time intervals. All of the foregoing operations producing the audible and visual distress signals will be accomplished automatically to quickly guide rescue facilities to the injured passengers and crew of the airplane.

The switch 76 is preferably located in a readily accessible exterior location, preferably on the stabilizer 22, so that should anyone aboard the crashed airplane be able to move about, such party can by turning the movable switch contact 78 fire the rockets 31 at will. This could be especially desirable should such person hear or see anything indicating that rescue facilities were in the vicinity and would see a flare.

Various modifications and changes are contemplated and may be resorted to without departing from the function or scope of the invention as hereinafter defined by the appended claims.

I claim as my invention:

1. An aircraft distress unit comprising an electric current source, an electrically activated visual signal means, an electrically operated audible signal, an electrically driven timer, a master switch, said current source, visual signal means, audible signal, timer, and master switch being mounted in a vertical stabilizer of an airplane, an electric circuit connecting the visual signal means to the current source and in which said timer is interposed, a second electric circuit connecting the audible signal to the current source, said master switch being interposed in both said electric circuits, a spring projected switch actuator means biasing the master switch to a circuit closing position, and tensioned restraining means connected to the switch actuator means and anchored to at least one part of the airplane which is especially susceptible to damage in a crash landing, said tensioned restraining means retaining the switch actuator means in a retracted position for maintaining the master switch in an open position, said restraining means being released by a crash landing and damage to said part of the airplane to which said restraining means is anchored to release the switch actuator, said switch actuator, when released, moving said master switch to a circuit closing position.

2. An aircraft distress unit as in claim 1, said restraining means including a nonelastic flexible element, a connector member interposed in and connecting spaced portions of said flexible element, and means connected to and leading from said connector member and anchored to other parts of the aircraft which are especially susceptible to damage to effect release of said connector member and flexible element when any one of the last mentioned aircraft parts are damaged whereby the master switch will be moved to a circuit closing position by said switch actuator means.

3. An aircraft distress unit as in claim 1, said restraining means including parts anchored to a plurality of parts of the airplane especially susceptible to damage in a crash landing, and means interconnecting said parts of said restraining means operable in response to damage to any of the parts of the aircraft to which a part of the restraining means is anchored to effect release of the part of the restraining means connected to said switch actuating means.

4. An aircraft distress unit as in claim 1, a cover forming a removable top section of the vertical stabilizer and forming a cover for said visual signal means, and electrically actuated means connected to the current source through the master switch for ejecting said cover from the stabilizer when the master switch is moved to a circuit closing position.

5. An aircraft distress unit comprising a self-contained electric current source mounted in a part of an airplane which is least susceptible to damage in a crash landing of the airplane, electrically activated visual signal means mounted in said airplane part, an electrically driven timer mounted in said airplane part and electrically connected to said current source and interposed in a circuit connecting the current source and visual signal means, a normally open switch interposed in the circuit of the visual signal means and in the electric circuit connecting the current source and timer, and means associated with said switch and with a part of the airplane especially susceptible to damage in a crash landing and including a spring projected element release to engage and effect closing of the switch when the last mentioned part of the airplane is damaged, to close the circuits of the current source to the visual signal means and timer whereby the visual signal means will be intermittently activated.

References Cited in the file of this patent

UNITED STATES PATENTS

| | | |
|---|---|---|
| 793,775 | Esser | July 4, 1905 |
| 2,199,990 | Godfrey et al. | May 7, 1940 |
| 2,323,064 | Lustfield | June 29, 1943 |
| 2,357,417 | Marple | Sept. 5, 1944 |
| 2,751,582 | Kuykendall | June 19, 1956 |
| 2,778,332 | Talbott | Jan. 22, 1957 |
| 2,831,967 | Bayze | Apr. 22, 1958 |
| 2,867,799 | Decarie | Jan. 6, 1959 |